W. V. GIST.
PLANTER.
APPLICATION FILED SEPT. 5, 1917.

1,276,900.

Patented Aug. 27, 1918.
2 SHEETS—SHEET 1.

Witnesses
F. B. Wooden
H. A. Mitchell

W. V. Gist
Inventor by C. A. Snow & Co.
Attorneys

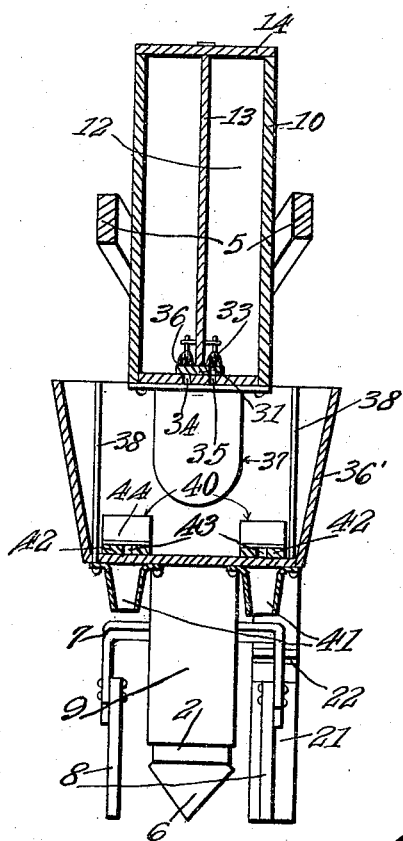
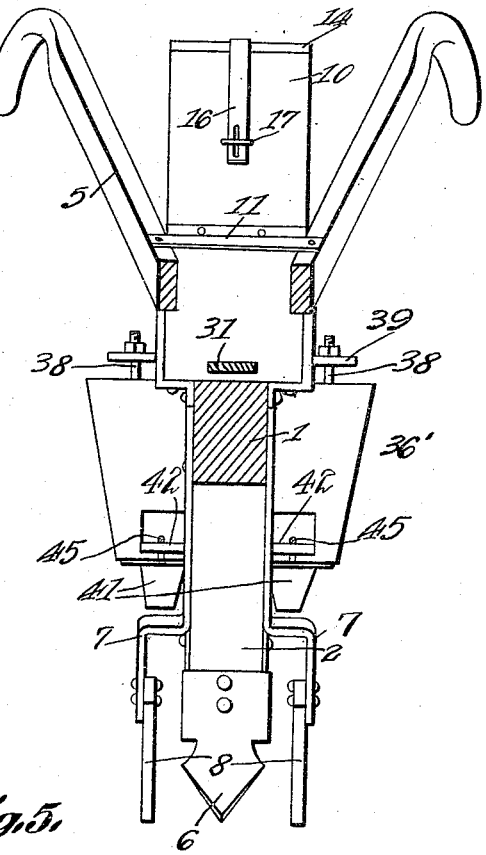
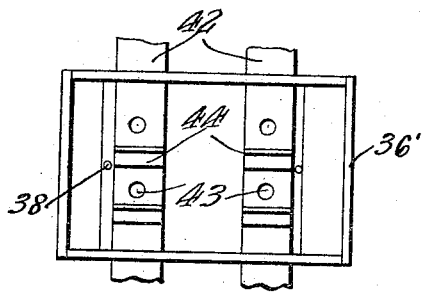

UNITED STATES PATENT OFFICE.

WILLIAM V. GIST, OF SPARTA, TENNESSEE.

PLANTER.

1,276,900.　　　　Specification of Letters Patent.　　Patented Aug. 27, 1918.

Application filed September 5, 1917. Serial No. 189,846.

*To all whom it may concern:*

Be it known that I, WILLIAM V. GIST, a citizen of the United States, residing at Sparta, in the county of White and State of Tennessee, have invented a new and useful Planter, of which the following is a specification.

The subject of this invention is a planter and the objects of the invention are, first, to provide a planter which will at the same time plant rows of different seeds, second, to provide a planter with a fertilizer distributer attachment, third, to provide a planter which may be readily changed to plant different varieties of seed, fourth, to provide a simple and efficient planter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:

Fig. 3 is a sectional view taken on the line 3—3 of Fig. 1.

Fig. 4 is a sectional view taken on the line 4—4 of Fig. 1.

Fig. 5 is a top plan view of the fertilizer distributer hopper.

Figure 1:
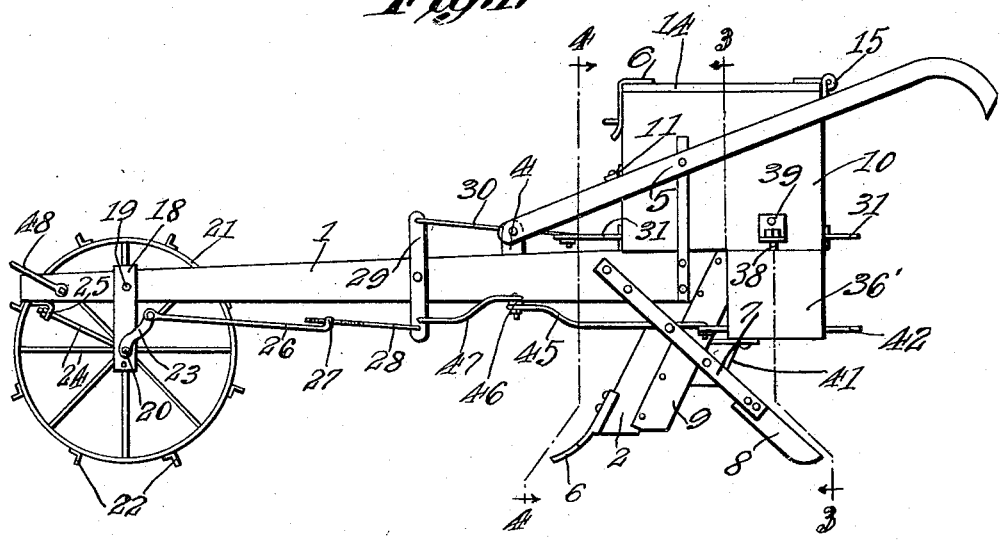
Figure 1 is a side elevation of a planter constructed in accordance with the invention.

Referring to the drawings by numerals of reference:

The main frame or support of the device, as will be seen, is constructed on the lines of an ordinary walking plow, and consists of the beam 1 from which depends the usual standard 2. A cross piece 3 extends transversely of the upper face of the beam 1 at one point thereon and is formed with upstanding ends 4 forming lugs or ears to which are secured by bolts or otherwise the ends of the plow handles 5.

A cultivator blade 6, of any suitable and preferred form, may be secured to the standard 2. Bars 7 may be secured to each side of the beam 1 and standard 2, from which they slope downwardly and rearwardly, and bent to form a yoke, as shown, to the lower ends of which are secured covering blades 8.

A discharge spout or duct 9 is formed on the rear edge of the standard 2 down which it projects terminating near the lower end of said standard.

Seated on the rear end of the beam 1 and embraced by the handles 5, is a seed box 10 which may be secured in place in any convenient manner as by the strap 11 which connects the handles 5 and is secured to the handles and the box 10 by screws or otherwise.

Figure 2:
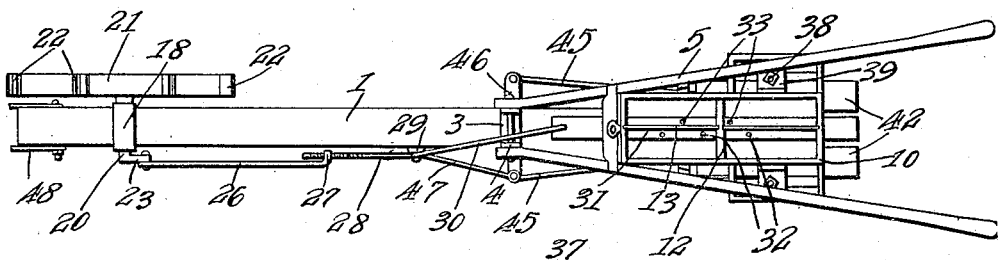
Fig. 2 is a top plan view of the same.

The box 10 may be of any suitable and convenient form and contains a transverse division plate 12 which is preferably centrally arranged, and a longitudinal division plate or plates 13 which are preferably secured in place by having their edges let into grooves formed in the transverse plate 12 and the end walls of the box. This, as will be seen most clearly in Fig. 2, divides the box into four compartments.

The box is provided with a lid 14 which is hinged as at 15 to the box. A hasp 16 is pivotally secured to the lid and receives a stud on the box to which it is secured by a wing nut 17 or the like.

A yoke 18, positioned with its arms depending, straddles the forward end of the beam 1 to which it is secured by a bolt 19 or otherwise. The free ends of the arms of said yoke 18 are apertured to form a journaling means for a horizontal shaft 20, the ends of which extend beyond the yoke. On one extending end of the shaft 20 is rigidly secured a wheel 21 provided with spaced peripheral cleats 22, while at the other end of the shaft 20 is secured a crank arm 23. A brace rod 24 has one end encircling the shaft 20, between the arms of the yoke 18 while the free end extends through an aperture formed in a bracket 25 which is suitably affixed to the under side of the beam 1 at its forward end. The free end of the rod 24 is threaded to receive a nut as shown, for the purpose of adjustably securing the brace rod in place.

An adjustable connecting rod, herein shown as composed of a section 26 formed with an angled end 27 apertured and threaded to receive the threaded end of a section 28, has one end pivotally secured to the pin of the crank 23 while the other end has pivotal engagement with one end of a swingle bar 29 which is pivotally secured to one side of the beam 1.

The other end of the swingle bar 29 is linked, through a connecting rod 30, to the forward end of a slide 31. The slide 31 extends longitudinally of the box 10 on the bottom of which it slides, and reciprocates through suitable slots formed in the end walls and transverse division wall 12 of the box. The slide is provided with suitable apertures 32 and 33 positioned to lie on opposite sides of the longitudinal division plate 13. These apertures are adapted to successively register with discharge ports 34 and 35 respectively, which ports are positioned to discharge into the spout 9.

Brushes 36 may be secured on each side of the division plate 18 for the purpose of preventing loose seeds being swept into the discharge ports by the slide and thus securing an even distribution of the seed.

The fertilizer distributer which forms a part of the planter is made detachable so that the same may be removed when desired.

This distributer consists of a box or hopper 36' preferably provided with a depression 37 in its forward wall to allow the box to take about the discharge spout or duct 9. The box or hopper is hung by rods 38 from brackets 39 which are suitably secured to the sides of the box 10.

In the front of the box, and adjacent each side thereof is provided a discharge port 40 which is positioned to discharge into a spout 41 extending downwardly and forwardly from the bottom of the box. A slide 42 reciprocates through each port 40 and its rear end projects through a suitable slot formed in the rear wall of the box 36. These slides 42 are provided with apertures 43 and adjacent each aperture is secured a cleat 44 which is formed, preferably, of angle iron and is arranged transversely of the slide. These cleats serve to rake the fertilizer from the box and cause it to be discharged through the apertures into the spouts 41. This, as will be understood, causes the fertilizer to be delivered into the furrow ahead of the covering blades 8.

Each slide 42 has its forward end linked by a connecting rod 45 to an end of a swingle bar 46 which is pivotally secured to the under side of the beam 1. One end of the swingle bar 46 is joined by a connecting rod 47 to an end of the swingle bar 29, and this mechanism serves to reciprocate the slides 42.

Any suitable connection, a fragment of which is indicated at 48, may be secured to the forward end of the beam 1 for the purpose of securing a horse to the planter, if desired.

As will be readily apparent, seed of different kinds may be placed on each side of the longitudinal division plate and one kind of seed will be deposited in each alternate hill, while the other kind of seed will be deposited in the intervening hills.

Having thus described the invention, what is claimed as new and sought by Letters Patent, is:

1. A planter, including a suitably supported hopper, a delivery spout associated therewith, means for delivering seed from the hopper to the spout, a fertilizer hopper associated with the first hopper, said fertilizer hopper having openings in the forward face thereof, slides in the hopper and working through the openings, cleats on the slides for collecting fertilizer and forcing it through the openings, and means for directing the fertilizer behind the delivery spout.

2. A planter, including a suitably supported seed hopper, a delivery spout associated therewith, means for delivering seed from the hopper to the spout, a fertilizer hopper detachably secured to the first hopper, the fertilizer hopper provided with ports in its front wall, slides in the hopper and working through the ports, means for operating the slides, said slides provided with openings, cleats on the slides behind the openings and adapted to collect fertilizer in position to drop through the openings, and spouts for receiving the fertilizer dropped through the openings and directing it behind the seed delivery spout.

In testimony that I claim the foregoing as my own, I have hereto affixed my signature in the presence of two witnesses.

WILLIAM V. GIST.

Witnesses:
  A. S. ALCOVER,
  T. W. JOHNSON.